United States Patent [19]

Christine

[11] 4,256,242
[45] Mar. 17, 1981

[54] DISPENSER HAVING A ROLLER FOR SQUEEZING AMOUNTS FROM A TUBE

[76] Inventor: William C. Christine, 341 St. John St., Catasauqua, Pa. 18032

[21] Appl. No.: 87,478

[22] Filed: Oct. 23, 1979

[51] Int. Cl.³ ............................................. G01F 11/02
[52] U.S. Cl. ..................................... 222/207; 222/214; 222/494
[58] Field of Search ............... 222/185, 207, 214, 494, 222/380, 383

[56] References Cited

U.S. PATENT DOCUMENTS

| | | | |
|---|---|---|---|
| 2,554,570 | 5/1951 | Harvey | 222/207 X |
| 2,647,661 | 8/1953 | Harvey | 222/207 X |
| 2,679,336 | 5/1954 | Frick | 222/494 X |
| 2,993,626 | 7/1961 | Gildersleeve | 222/214 |
| 3,066,832 | 12/1962 | Rossetti | 222/207 |
| 3,232,496 | 2/1966 | Rockwell, Jr. et al. | 222/185 X |
| 3,881,641 | 5/1975 | Pliml, Jr. | 222/207 |
| 4,130,224 | 12/1978 | Norman et al. | 222/207 X |

FOREIGN PATENT DOCUMENTS 526895  9/1956  Belgium .................... 222/214

*Primary Examiner*—David A. Scherbel
*Attorney, Agent, or Firm*—Sherman Levy

[57] ABSTRACT

A dispenser is provided that includes a housing that embodies a base portion and a hingedly mounted cover. A service unit comprising a collapsible bag or package for holding the material to be dispensed is positioned within the housing or cabinet, and an operating lever or handle is provided for actuating and dispensing predetermined, controlled amounts of material from the package.

3 Claims, 8 Drawing Figures

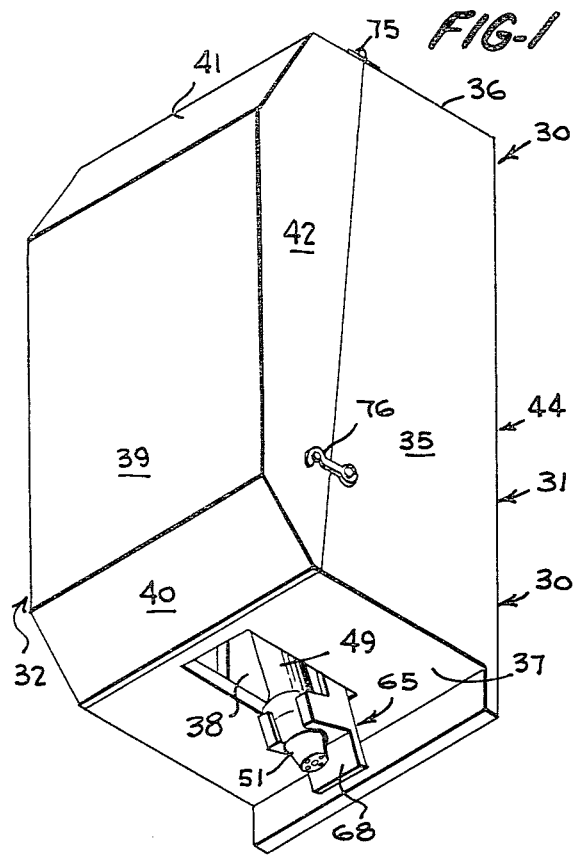
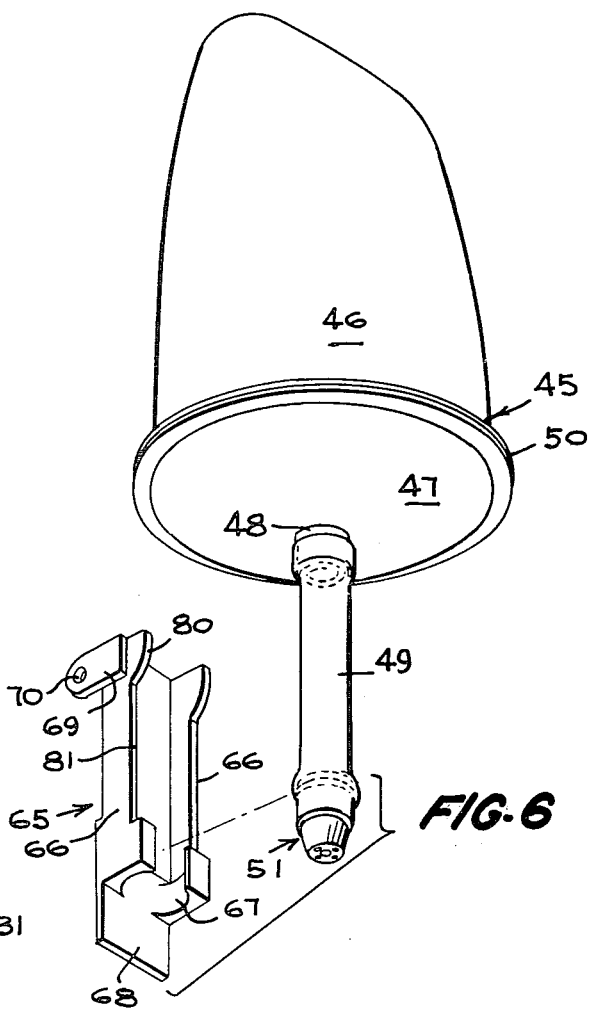
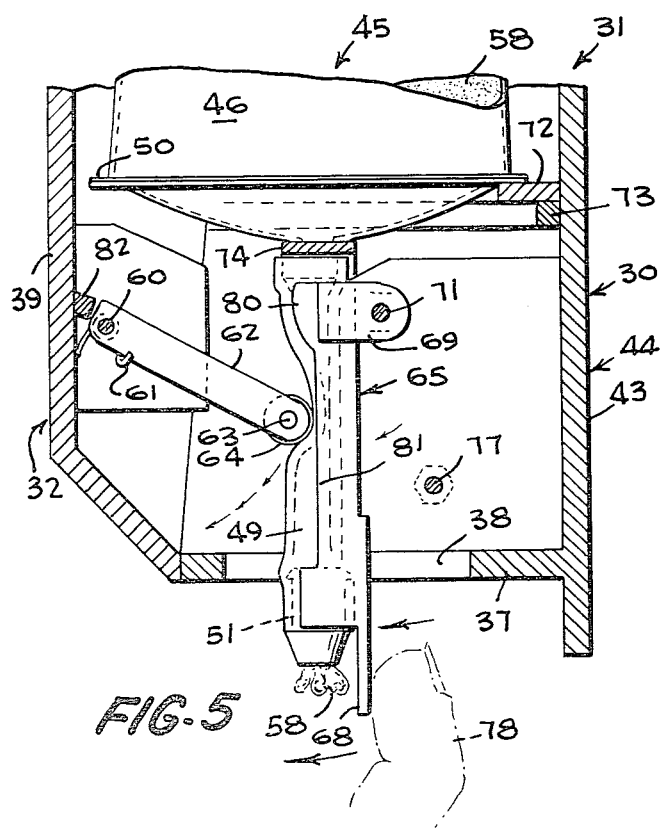
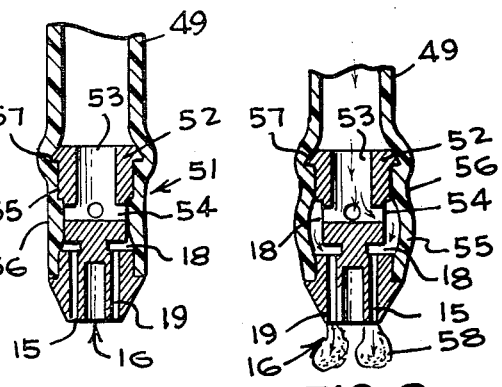

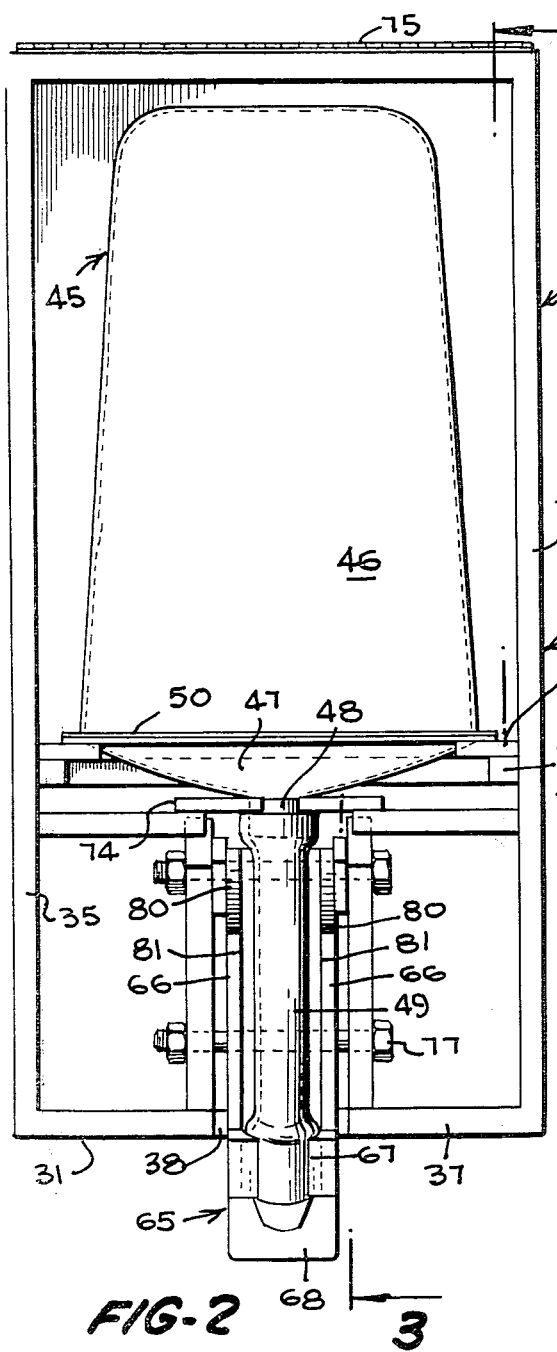
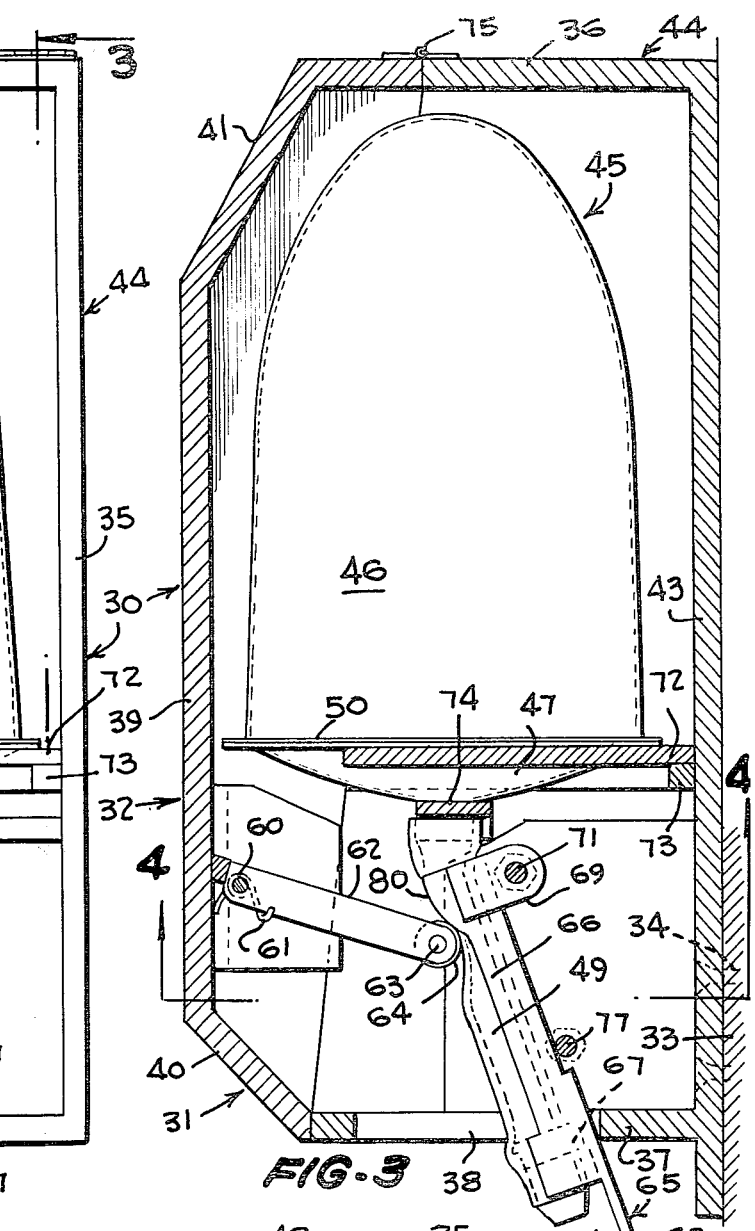
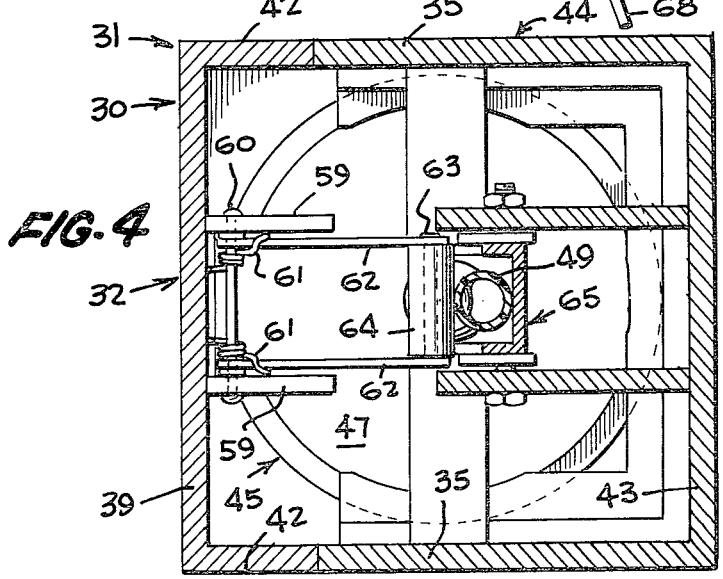

DISPENSER HAVING A ROLLER FOR SQUEEZING AMOUNTS FROM A TUBE

FIELD OF THE INVENTION

Heretofore various types of dispensers have been provided such as those shown in prior U.S. Pat. Nos. 3,066,832, 2,113,022, 3,768,704, 3,930,761, and 3,881,641. It is pointed out however, that neither these prior patents nor any others known to applicant provide the advantages and features set forth and accomplished by the present invention.

BACKGROUND AND SUMMARY OF THE INVENTION

In the present invention there is provided a dispensing system for fluidic materials, and wherein the dispensing system includes a cabinet that can be mounted on a wall, or a pedestal or the like. The fluidic material may be liquid, semi-liquid, or the like.

The present invention is especially suitable for use in an institutional environment because it offers a low cost bulk package of product. The bag or package is disposable and the material within the bag does not contact the operating mechanism so that a highly sanitary method of dispensing the product is provided which complies with today's rigid environmental requirements.

An important object of the present invention is to provide a dispensing system for fluidic materials wherein a metered amount of product can be released or dispensed upon each actuation of the dispensing mechanism, and wherein the dispensing mechanism can be manually actuated or wherein power means can be provided for actuating the dispensing mechanism.

A still further object of the present invention is to provide a dispensing system wherein the fluidic material is dispensed from the bag without air being introduced back into the bag or container as the expelled product is dispensed.

Still another object of the present invention is to provide a dispensing system that has improved characteristics and advantages as compared to previous apparatus or devices.

Other objects and advantages of the present invention will become apparent in the following specification when considered in the light of the attached drawings.

BRIEF DESCRIPTION OF THE DRAWINGS

FIG. 1 is a perspective view of the dispenser of the present invention, and showing the cover in closed position on the base portion.

FIG. 2 is a vertical view taken through the dispenser with the front cover removed.

FIG. 3 is a sectional view taken on the line 3—3 of FIG. 2.

FIG. 4 is a sectional view taken on the line 4—4 of FIG. 3.

FIG. 5 is a fragmentary sectional view illustrating the co-action of the roller and operating mechanism for dispensing material from the tube.

FIG. 6 is a perspective view showing certain of the parts separated, such as the bag and a part of the operating mechanism, for clairty of illustration.

FIG. 7 is an enlarged sectional view illustrating the check valve.

FIG. 8 is a view similar to FIG. 7 but showing the parts in open position as when the material is being dispensed.

DESCRIPTION OF THE PREFERRED EMBODIMENT

Referring in detail to the drawings, the numeral 30 indicates the dispenser of the present invention that includes a cabinet or housing 31, FIG. 1, and the cabinet or housing 31 includes a base portion or back portion 44 as well as a cover member 32. The base portion 44 includes a back well 43 that can be secured to a suitable supporting structure such as a vertical wall 33 by means of securing elements or screws 34, FIG. 3. It is to be understood however, that the cabinet can be secured to a pedestal or mounted in other suitable manners as desired or required.

The base portion 44 includes spaced parallel side walls 35 as well as a top wall 36 and a bottom wall 37, and the bottom wall 37 has a slot or opening 38 therein for a purpose to be later described.

The cover member 32 includes a front wall section 39 as well as inclined bottom and top wall sections 40 and 41, and spaced apart side wall sections 42.

Removably mounted within the cabinet 31 is a service unit that comprises a bag or container 45 that includes a flexible or collapsible body portion 46 as well as a container top 47, FIG. 6. A neck 48 is formed integral with the container top 47, and the container top 47 and collapsible bag portion 46 have flanged portions secured together as at 50, and such flanged portions may be secured together by means of heat sealing, ultrasonic welding, suitable adhesives or the like. A dispensing tube 49 has one thereof arranged in engagement with the neck 48 as shown in the drawings.

As shown in FIGS. 7 and 8, there is provided a check valve which is indicated generally by the numeral 51, and the check valve 51 includes a plug 52 that has a passageway or conduit 53 therein. The plug 52 is mounted in the lower end of the tube 49, and the plug 52 includes ports or passageways 54 which communicate with the passageway 53. The tube 49 includes a portion 55 that surrounds a barb 57 of the plug 52, and the tube 49 further includes a portion 56 that, because of its elastomeric nature can move from the closed position shown in FIG. 7 to the open position as shown in FIG. 8 so that material such as the material 58 can be dispensed in metered quantities through the ports 54, then through ports 18, and then through passageways 19, when the device is properly actuated.

Mounted in the cover portion 32 of the cabinet is a pair of lugs or bracket members 59 which have a pivot pin 60 extending therebetween, there being one or more spring members 61 mounted on the pin member 60 for a purpose to be later described, as shown in FIG. 4. A pair of spaced parallel bars 62 are pivotally mounted on the pin 60, and spring member 61 urge or bias the bars 62 in the proper direction. Carried by the pair of bars 62 is a pin or shaft 63 which has a roller 64 mounted thereon, and the roller 64 is adapted to selectively engage the dispensing tube 49 so that as later described in this application, the material 58 will be dispensed when the device is properly actuated.

Stop member 82 limits stroke of roller 64 and allows memory of elastomeric tube 49 to provide an opening to allow product to flow down the tube.

The dispenser further includes an operating lever or handle 65 that includes a support portion 66, FIG. 6, as well as a curved open portion 67 that defines a clip and there is further provided a projecting end 68 that can be conveniently manually engaged as shown in FIG. 5 by the user's fingers 78 so that the device can be actuated or operated. Fixed to an end of the lever 65 or formed integral therewith are spaced parallel ears or lugs 69 which have apertures 70 therein, and a pivot pin 71 extends through the apertures 70. The numeral 77 indicates a stop pin for limiting movement of the lever 65 as shown in FIG. 3. Suitable shelf means and support pieces or braces 72, 73 and 74 are arranged within the cabinet as shown in the drawings. The numeral 75 indicates a hinge whereby the cover 39 can be swung open about the hinge 75 as for example when the bag 45 is to be removed and replaced. One or more latches 76 are provided for selectively retaining or maintaining the cover 39 in its closed position on the base portion 44 of the cabinet 31.

From the foregoing, it will be seen that there has been provided a dispenser for fluidic materials, and in use with the parts arranged as shown in the drawings, when the device is being used, the package 45 containing the material to be dispensed is positioned in the cabinet 31 as shown in FIGS. 2 and 3. Initially, the operating lever 65 is in the position shown in FIG. 1 and then when it is desired to dispense material from the bag, the user's fingers 78 engage the projecting portion 68 of the lever so that the parts are moved from a position such as that shown in FIG. 3 to a position such as that shown in FIG. 5. As manual pressure is applied to the lever 65, the lever 65 will pivot on an axis about the pin 71. This will cause the roller 64 to co-act with the lever 65 so that the fluidic material that is in the tube 49 will be squeezed downwardly through the tube 49 as shown in FIG. 5, and as pressure is applied between the roller 64 and the lever 65, the check valve 51 will open so that the parts will move from the position shown in FIG. 7 to the position shown in FIG. 8. That is, due to the pressure being applied, the fluidic material will flow downwardly through the passageway 53, and then through the passageways 54 to cause the section 56 of the tube 49 to expand or move away from the plug 52 whereby the material 58 will be dispensed in the desired manner. When manual pressure is released from the portion 68 of the lever 65, the parts will return to their initial position due to the provision of the spring members 61. The stop member 82, FIG. 5 serves to limit the stroke of the roller 64 and permits the memory of the elastomeric tube 49 to provide an opening that permits product to flow down the tube. The pin 77 functions as a stop member to limit counter-clockwise pivotal movement of the lever 65 as shown in FIG. 3. Varying the location of pin 77 will vary the quantity of product dispensed. The clip 67 holds the tube tip so that the product is dispensed in a manner so that it always is deposited in the palm of the user's hand.

It will be seen that with this contruction, a metered quantity of material from the bag 46 will be dispensed from the bag out through the lower end of the tube 49 and this material can be used for any desired purpose.

The parts can be made from any suitable material and in different shapes or sizes as desired or required.

It will be noted that the bag or package 45 is of the disposable type. Thus, when the bag 45 is empty, it is only necessary to disengage the latch 76 whereby the cover 32 can be pivoted about the hinge 75 so that the cover 32 can be swung open whereby the empty bag 45 can be replaced with a new bag that is full of material to be dispensed.

When manual pressure is released on the lever 65, the parts, including the check valve 51 will return to the closed position as shown in FIG. 7 so that material will only be dispensed when the mechanism is actuated.

It will therefore be seen that there has been provided a dispensing system for fluidic material wherein the fluidic material in the bag 45 can be liquid, semi-liquid, or other desired form. There is provided an outer cabinet or housing, together with an actuator, and arranged within the cabinet is the service unit type package 45 which is in the form of a bulk container that is collapsible. The portion 46 of the bag 45 is flexible, and the end piece 47 is rigid so that the desired results can be accomplished.

The present invention is adapted to be used in a wide variety of applications where it is required that a metered amount of product be released upon each actuation of the dispensing mechanism. The device or system is especially suitable for use in an institutional environment inasmuch as it offers a low-cost bulk package of product. Also, the package is disposable. The device can be actuated through very simple means and occupies a minimum amount of space in its emptied condition, and it is especially suitable for today's rigid environmental requirements. Further, the product contained within the package never contacts any of the operating mechanism so that there is provided a highly sanitary method of dispensing the product. The dispensing system can be in the form of a wall mounted unit, or the device can be mounted on a pedestal, or it can be console mounted or suspended in an otherwise suitable location. The dispenser can be actuated by hand pressure on the operating lever, or a foot lever can be used or the device can be power operated by air pressure or an electric motor, or similar linear actuator.

The tubing 49 is made of a material that is characterized for its recovery characteristics. The tube 49 can be folded during the shipping cycle and unfolded when the package is ready for use. The container 45 and the pump tube 49 constitute the service unit with the exception of a printed box-board sleeve or boxed as the customer may require or desire. The parts can be adjusted so that different pre-measured amounts can be dispensed. The coaction of the roller 64 and the movable lever causes product to be expelled so that the product will be released through the lower end portion of the tube 49 in an action similar to peristalsis. The elastomeric tube 49, having a memory, returns to a rounded shaped tube causing a slight vacuum in the tube, and because the portion 46 is collapsible and due to the force of atmospheric pressure present, the product will be squeezed into the tube 49 from the container 45 so that the system is then ready for the next cycle. Inasmuch as the amount of tubing squeezed is uniform for each operating stroke, there will be produced a precise amount of product from each dispensing stroke. Further, the recovery of the tube and refill is accomplished rapidly so that fast cycling of the system is accomplished.

The container 45 includes the portions 46 and 47. The portion 46 is made of soft flexible maerial, such as a suitable plastic, including polyethylene, and the like. The piece 47 is made of rigid material. It will be seen that the service unit includes the check valve 51, pump tube 49, container top 47, and container base 46. The lever 65 can be remotely powered. FIGS. 7 and 8 illustrate the internal check valve. The pump tube 49 can be made of latex, PVC, or other suitable elastomeric material. It will be seen that there has been provided a dispenser which consists of a container which can be made in two pieces by a thermo-forming process, and wherein the cover is of a relatively rigid material and the container base is of a relatively flexible material. The dispenser is especially suitable for metered dispensing of the fluid product. It will be seen that there is provided a novel method and means for accomplishing the dispensing. An important feature of the present invention is the check valve used in conjunction with the elastomeric tube 49 as a peristaltic pump. The container 45 comprises two pieces, namely the base 46 which is thermo-formed from a flexible polymer appropriately alloyed to provide the essential physical characteristics whereby there will be provided a sufficient barrier or barrier properties for the fluid product contained in the bag. Further the material will provide sufficient strength for the normal distribution cycle for which the product is intended, and will be sufficiently soft or free of memory so that as the product is extracted from the container, it will collapse from the force of atmospheric pressure and the slight vacuum effect created by the extraction pump. The portion 46 includes a dome shape with a transverse axis.

The container 45 further includes the part 47 which in use in the dispenser becomes the bottom, since the package is inverted in its in use position. The part 47 is formed from a relatively rigid material and includes a flange which matches identically with a flange on the portion 46 as at 50, and the part 47 further includes a spout 48 which will subsequently become the discharge spout. When the parts 46 and 47 are welded as at 50, a completely closed container is formed. Such closed containers are adapted to be created, filled and sealed and in a highly efficient manner. In the process of creating, filling and sealing the containers, the pump assembly can be added to the container and can be attached to the previously pierced spout 48 on the member 47. The completed assembly of the container with its elastomeric pump tube is thus provided. When manufacturing the containers, the individual containers are separated and can be automatically deposited into shipping cartons and the like. When the device is being used, the operating arm or lever 65 is manually moved as previously described so that the lever 65 moves in an arc whereby the product is dispensed with the motion of the operating handle, and with the present invention the operating forces required to operate the dispenser are significantly lower than similar mechanisms required to perform the same function.

The dispenser consists of the cabinet with the door appropriately latched as 76, and in operation the door or cover 39 is opened and an airless collapsible container type of package 45 is placed on the shelf portion of the dispenser. The pump tube 49 is extended downward along the operating handle 65 through the portions defined by the wall section 66, and through the portion 67 so that the portion 67 provides a clamping action for the tube. The cabinet is then closed and the unit is ready to operate.

To operate the unit, the user manually moves the lever 65 and this causes the roller 64 to progressively roll down the tube 49 towards the check valve 51 against the tension of the torsion spring 61 located on the pivot axis of the roller arm. Release of the operating arm by the user, causes the force of the torsion spring 61 to return the roller arm back against its stopped location and this completes the cycle of operation as the roller forces the operating arm back to its starting position.

On the forward stroke, as the operating lever is advanced, the roller 64 on the roller arm creates more and more pressure against the elastomeric tube 49 until the pressure of the roller has the tube completely closed. Thereafter, as the operating arm advances further, the roller arms give away and move downward. The roller progresses along the tube, and forces the fluid contained in the tube down through the check valve discharging through the orifices 54 provided.

At the end of the forward stroke and the release of the operating lever, the roller 64 travels back up the essentially empty tube where, since the roller arm is stopped against the pin or the like, the pressure of the liquid in the collapsible container combined with atmospheric pressure and the memory in the tube is sufficient to cause the liquid to flow down past the stopped roller and re-fill the tube.

The operating cycle then repeats.

It will be seen that the roller provides a camming action as for example due to the provision of the inclined cam surfaces 80 on the lever 60 and the straight edged portions 81. Thus, the dispensing action takes place as the device is actuated.

While one form of a handle or operating lever has been illustrated and described in the drawings, it is to be understood that such details of construction can be modified or changed as desired or required. Similarly, the type of valve that is used can be varied as desired or required.

With further reference to the valve construction shown in FIGS. 7 and 8, the numeral 16 indicates the dispensing end of the valve 51. The barb 57 engages the elastomeric tube 49. The numeral 53 indicates the primary in-feed port or passageway. There is further provided on the valve 51 transverse ports 54, as well as secondary in-feed ports 18. A discharge nozzle 15 is defined, and the valve may be provided with a counterbore as well as the dispensing end or tip 16.

As previously noted, the configuration of the handle can be changed as desired or required. A suitable cover can be provided for the check valve.

When the cover is closed on the cabinet, the service unit is clamped in place. The service unit consists of the bag or package which has the pump tube 49 molded as an integral part thereof. The check valve is carried by the free end of the pump tube. The size of the package can be varied as desired or required, as for example the package can be made of a size to facilitate vacuum forming thereof.

While several embodiments of the present invention have been illustrated herein in particular detail, it will be understood that variations and modifications may be effected without departing from the spirit and scope of the novel concepts of this invention.

What is claimed:

1. In a dispenser, a housing comprising a base portion having a back wall, spaced parallel side walls, a bottom portion having a slot therein, said housing further embodying a top portion, a cover hingedly connected at its top to said base portion, said cover including a front wall section, inclined bottom and top wall sections, and spaced parallel side wall sections, hinge means and latch means for said cover, a service unit removably mounted in said housing for holding material to be dispensed, said service unit including a collapsable body portion, a rigid end piece affixed to said body portion, a spout on said end piece, a removable elastomeric dispenser tube having an end connected to said spout, said tube having its lower end projecting through the slot in the bottom portion of said housing, said tube having memory, bracket members mounted in the cover portion of the said housing, a pivot pin extending between said bracket members, spring means mounted on said pivot pin, bars pivotily mounted on said pin, a shaft connected to said bars, a roller mounted on said shaft, said roller selectively engaging said tube, a stop member for limiting movement of said roller, an operating lever including a support portion and a curved end portion that defines a clip for selectively engaging said tube, and said operating lever further including a projecting end to be conveniently gripped by the user's fingers, ears affixed to said lever, and said ears having apertures therein, a pivot pin extending through apertures in the ears, and a check valve mounted in an end of tube.

2. The structure as defined in claim 1, wherein the check valve includes a plug having passageway therein, and wherein because of the elastomeric nature of the tube, material can be dispensed in metered quantities when the device is properly actuated so that product can flow down the tube to the desired location.

3. The structure as defined in claim 1, wherein the service unit provides an airless collapsable container package that contains fluidic material, and wherein pressure of the fluidic material in the collapseable container combined with atmospheric pressure is sufficient to cause the fluidic material to selectively re-fill the tube when the device is being used.

* * * * *